United States Patent
Ma et al.

(10) Patent No.: US 11,711,299 B2
(45) Date of Patent: Jul. 25, 2023

(54) TRAFFIC MIRRORING IN HYBRID NETWORK ENVIRONMENTS

(71) Applicant: Cisco Technology, Inc., San Jose, CA (US)

(72) Inventors: Xueqiang Ma, Sunnyvale, CA (US); Dave Persaud, San Jose, CA (US); Kalyan Ghosh, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 16/863,713

(22) Filed: Apr. 30, 2020

(65) Prior Publication Data

US 2021/0218673 A1 Jul. 15, 2021

Related U.S. Application Data

(60) Provisional application No. 62/959,751, filed on Jan. 10, 2020.

(51) Int. Cl.
*H04L 45/74* (2022.01)
*G06F 9/455* (2018.01)
*H04L 67/1095* (2022.01)

(52) U.S. Cl.
CPC .......... *H04L 45/74* (2013.01); *G06F 9/45558* (2013.01); *H04L 67/1095* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,041,042 A * | 3/2000 | Bussiere | H04L 41/00 370/245 |
| 8,520,540 B1 * | 8/2013 | Foschiano | H04L 43/106 370/252 |
| 9,860,309 B2 | 1/2018 | Doctor et al. | |
| 9,906,401 B1 | 2/2018 | Rao | |
| 9,954,751 B2 | 4/2018 | Zhang et al. | |

(Continued)

FOREIGN PATENT DOCUMENTS

| | | |
|---|---|---|
| CN | 107690778 A | 2/2018 |
| EP | 3304821 B1 | 4/2018 |
| WO | WO2016195909 A1 | 12/2016 |

OTHER PUBLICATIONS

Cisco Packet Corner, Encapsulated Remote Span (ERSPAN). Published Jun. 14, 2014. (Year: 2014).*

(Continued)

*Primary Examiner* — Ajit Patel
*Assistant Examiner* — Liem H. Nguyen
(74) *Attorney, Agent, or Firm* — Lee & Hayes, P.C.

(57) ABSTRACT

This disclosure describes various methods, systems, and devices related to mirrored traffic forwarding in a hybrid network. An example method includes receiving, from a source forwarder in a source network, a mirrored data packet. A session of the mirrored data packet may be identified based on a header of the mirrored data packet. A destination forwarder in a destination network may be identified based on the session. The destination network may be different than the source network. The mirrored data packet may be forwarded to the destination forwarder.

18 Claims, 7 Drawing Sheets

(56) References Cited

U.S. PATENT DOCUMENTS

| | | | |
|---|---|---|---|
| 10,177,963 B2 | 1/2019 | Rao | |
| 10,432,426 B2 | 10/2019 | Wang et al. | |
| 10,454,831 B1* | 10/2019 | Volpe | H04L 47/125 |
| 10,491,466 B1* | 11/2019 | Hira | H04L 41/0895 |
| 2001/0033580 A1* | 10/2001 | Dorsey | H04L 9/40 |
| | | | 370/469 |
| 2004/0003094 A1* | 1/2004 | See | H04L 43/026 |
| | | | 709/227 |
| 2005/0256972 A1* | 11/2005 | Cochran | G06F 11/2071 |
| | | | 709/245 |
| 2010/0054152 A1* | 3/2010 | Foschiano | H04L 43/0811 |
| | | | 370/253 |
| 2011/0296000 A1* | 12/2011 | Ferris | G06Q 10/00 |
| | | | 718/1 |
| 2013/0198564 A1* | 8/2013 | Hasit | G06F 17/30079 |
| | | | 709/219 |
| 2014/0016482 A1* | 1/2014 | de Silva | H04L 43/026 |
| | | | 370/250 |
| 2015/0106511 A1* | 4/2015 | Astigarraga | H04L 67/1095 |
| | | | 709/224 |
| 2016/0182336 A1* | 6/2016 | Doctor | H04L 43/12 |
| | | | 709/224 |
| 2016/0269482 A1* | 9/2016 | Jamjoom | H04L 67/1095 |
| 2016/0352601 A1* | 12/2016 | Zhang | H04L 43/0829 |
| 2017/0223104 A1* | 8/2017 | Keesara | H04L 43/14 |
| 2018/0109602 A1 | 4/2018 | Doctor et al. | |
| 2018/0124139 A1* | 5/2018 | Jiang | H04L 65/611 |
| 2018/0124171 A1* | 5/2018 | Han | H04L 45/566 |
| 2018/0145885 A1 | 5/2018 | Rao | |
| 2018/0145886 A1 | 5/2018 | Rao | |
| 2018/0145899 A1 | 5/2018 | Rao | |
| 2018/0145916 A1 | 5/2018 | Rao | |
| 2018/0159723 A1 | 6/2018 | Rao | |
| 2018/0241610 A1 | 8/2018 | Wang et al. | |
| 2018/0349163 A1* | 12/2018 | Gao | H04L 49/208 |
| 2019/0116082 A1 | 4/2019 | Rao | |
| 2019/0327293 A1* | 10/2019 | Martini | H04L 41/0893 |
| 2020/0044910 A1 | 2/2020 | Rao | |
| 2020/0162357 A1* | 5/2020 | Zacks | H04L 43/026 |
| 2020/0220797 A1* | 7/2020 | Suzuki | H04L 12/4679 |
| 2020/0275360 A1* | 8/2020 | Bordeleau | H04L 41/0816 |
| 2020/0396301 A1* | 12/2020 | Abhigyan | H04W 40/02 |
| 2020/0403826 A1* | 12/2020 | Dawani | H04L 12/4633 |
| 2021/0029087 A1* | 1/2021 | Uy | H04L 43/062 |

OTHER PUBLICATIONS

PCT Search Report and Written Opinion from corresponding PCT Application No. PCT/US2021/012558 dated Mar. 10, 2021, a counterpart foreign application for U.S. Appl. No. 16/863,713, 16 pages.

* cited by examiner

TRAFFIC MIRRORING IN HYBRID NETWORK ENVIRONMENTS

CROSS-REFERENCE TO RELATED APPLICATION

This application claims priority to U.S. Provisional Application No. 62/959,751, filed on Jan. 10, 2020, and which is incorporated by reference herein in its entirety.

TECHNICAL FIELD

The present disclosure relates generally to forwarding and/or analyzing mirrored data traffic in hybrid network environments, such as hybrid cloud environments.

BACKGROUND

Businesses, hospitals, schools, and other organizations utilize various computing resources to store and/or process data. Traditionally, an organization would use computing resources in data centers that were physically located on the premises of the organization (i.e., an "on-premise data center"). However, as the needs of the organization would change over time, changing the computing resources in the data centers could be expensive or otherwise burdensome.

In order to reduce these and other burdens, an organization can use a portion of pooled computing resources provided by a cloud computing provider. These computing resources can be allocated for use by the organization, on-demand. For example, an organization utilize a portion of cloud computing resources that are in data centers managed by a cloud computing provider. These data centers may be interconnected in proprietary communication networks of the cloud computing provider. Accordingly, as the needs of the organization change over time, different amounts of the cloud computing resources can be allocated to the organization on an as-needed basis, without the cloud computing resources being hosted by on premises data centers of the organization.

Although cloud computing can provide a number of advantages to organizations, cloud computing environments can provide a number of unique challenges to organizations, as well. In particular, an organization may utilize computing resources managed by multiple cloud computing service providers in a hybrid network environment. However, these service providers may be unable to communicate with each other. For example, a native traffic mirroring service in one cloud-provider network may be unable to forward mirrored traffic to another service in another cloud-provider network. Accordingly, it can be a challenge to coordinate cloud computing resources distributed across the hybrid network environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
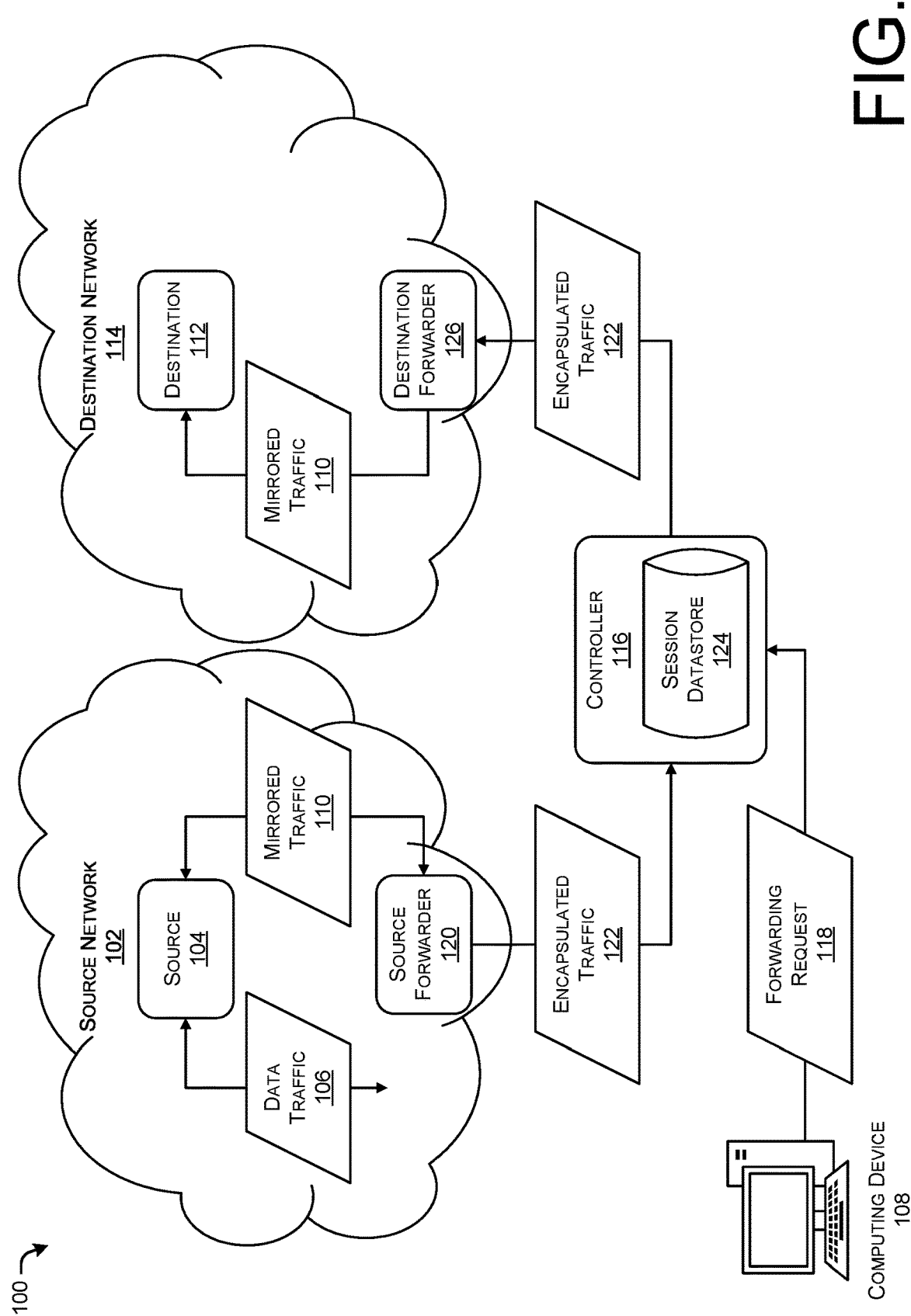
FIG. 1 illustrates an example environment for transmitting mirrored data packets between different networks.

This disclosure describes various techniques for forwarding mirrored traffic in a hybrid network environment. An example method includes receiving, from a source forwarder in a source network, a mirrored data packet; identifying, based on a header of the mirrored data packet, a session of the mirrored data packet; identifying, based on the session, a destination forwarder in a destination network, the destination network being different than the source network; and forwarding the mirrored data packet to the destination forwarder. In some examples, the source forwarder includes a first virtual machine (VM), a first container, or a first program hosted in resources of the source network, and the destination forwarder includes a second VM, a second container, or a second program hosted in resources of the destination network. In various implementations, the mirrored data packet includes an Encapsulated Remote Switch Port Analyzer (ERSPAN) data packet encapsulated in a Generic Routing Encapsulation (GRE), and the header includes an ERSPAN header of the mirrored data packet. In some instances, the mirrored data packet includes a copy of an original data packet that was transmitted or received by at least one node in the source network, the original data packet complying with one or more traffic mirroring rules. In some cases, the destination forwarder forwards the mirrored data packet to a traffic analyzer service in the destination network. According to some implementations, identifying the session includes extracting, from the header of the mirrored data packet, a session identifier (ID). In various examples, the source network includes a first cloud-based network and the destination network includes a second cloud-based network.

An example system includes at least one processor; and memory storing instructions that, when executed by the at least one processor, cause the system to perform operations. In various instances, the operations include receiving, from a source forwarder in a source cloud-based network, a mirrored data packet; identifying, based on a header of the mirrored data packet, a session of the mirrored data packet; identifying, based on an entry of a datastore corresponding to the session, a destination forwarder in a destination cloud-based network, the destination cloud-based network being different than the source cloud-based network; and forwarding the mirrored data packet to the destination forwarder.

According to various implementations, an example system includes a forwarder in a first cloud-based network and a controller connected to the first cloud-based network. The forwarder includes at least one first processor; and first memory storing first instructions that, when executed by the at least one first processor, cause forwarder to perform first operations. The first operations include receiving, from a source in the first cloud-based network, a mirrored data packet; translating the mirrored data packet from a first format to a second format; encapsulating the mirrored data packet; and transmitting the mirrored data packet to the controller. In various examples, the controller includes at least one second processor; and second memory storing a table and second instructions that, when executed by the at least one second processor, cause the controller to perform second operations. The second operations include receiving, from the source forwarder, the mirrored data packet; identifying, based on a header of the mirrored data packet, a session of the mirrored data packet; identifying, based on an entry of the table corresponding to the session, a destination forwarder in a second cloud-based network, the second cloud-based network being different than the first cloud-based network; and forwarding the mirrored data packet to the destination forwarder.

EXAMPLE EMBODIMENTS

Various implementations of the present disclosure relate to forwarding mirrored data traffic between multiple networks in a hybrid network environment. In various examples, a controller can be connected to multiple networks, which may be unable to communicate forward mirrored traffic between designated forwarders in individual networks in a hybrid network environment.

Various implementations described herein provide particular improvements to the field of computer networking. For example, various implementations can be used to enable data traffic in one network to be analyzed and/or load balanced in another network, even when the networks are managed by different providers and/or may utilize incompatible communication protocols. Accordingly, various implementations described herein can improve interoperability of different networks in a hybrid network environment, such as different cloud networks managed by different cloud providers.

Various implementations of the present disclosure will be described in detail with reference to the drawings, wherein like reference numerals present like parts and assemblies throughout the several views. Additionally, any samples set forth in this specification are not intended to be limiting and merely set forth some of the many possible implementations.

FIG. 1 illustrates an example environment 100 for transmitting mirrored data packets between different networks. As illustrated, the environment 100 includes a source network 102. The source network 102 may be a cloud-based network. As used herein, the terms "cloud-based network," "cloud network," "service provider network," and their equivalents can refer to a networked collection of computing resources that can be dynamically provisioned and allocated to users, clients, or other devices on a demanded or as-needed basis. As used herein, the computing resources can include memory resources, processing resources, applications, services, Virtual Machines (VMs), or the like. In a cloud-based network, resources can be distributed over one or more physical devices (e.g., servers), which can be located in different towers, buildings, data centers, geographical regions, or the like.

The source network 102 may include various nodes. As used herein, the terms "node," "network node," and their equivalents, can refer to any entity within a network that can transmit data packets to and/or receive data packets from at least one other node. A node may be a device, a software instance, a VM, or the like. In some examples, a node can be a client, a server, or a combination thereof. Various nodes within a cloud-based network may be interconnected by a secure communication network over which data traffic can be exchanged. For example, the source network 102 may include a secure communication network over which data traffic can be exchanged between various nodes in the source network 102.

In various implementations, a source 104 may be a node in the source network 102. The source 104 may, in various implementations, include a software instance and/or VM hosted by computing resources in the source network 102. The source 104 may include one or more interfaces (e.g., virtual interface(s)) by which the source 104 receives and/or transmits data traffic 106. The data traffic 106 can include multiple data packets being transmitted between the source 104 and one or more other nodes, such as other nodes in the source network 102. As used herein, the terms "packet," "data packet," and their equivalents, can refer to a unit of data that is transmitted between two nodes. In various examples, a packet may have a header, which may include control data, and a payload, which may include additional data carried in the packet. The header may include information such as an identifier of the source of the packet, an identifier of the destination of the packet, an indication of the type of user data in the payload, or the like. In some cases, a packet can be defined by a particular networking protocol, such as Internet Protocol (IP), Transmission Control Protocol (TCP), User Datagram Protocol (UDP), or another networking protocol.

The source 104 may be associated with at least one user and/or at least one account. The account may enable the user to control and/or manage operations of the source 104 remotely, such as from a computing device 108 that is outside of the source network 102. The source network 102, for instance, may provide an Application Programming Interface (API) by which the user(s) can control and/or manage operations of the source 104. In some cases, the user(s) may desire to monitor, analyze, or otherwise inspect the data traffic 106. For example, the user(s) may generate a VM within the source network 102 that intercepts, copies, and/or forwards the data traffic 106 to the computing device 108 or some other entity. However, intercepting the data traffic 106 directly may introduce unacceptable latency into communications and/or operations of the source 104.

In various implementations, the data traffic 106 can be mirrored for further inspection. As used herein, the term "traffic mirroring" can refer to a process by one or more data packets transmitted and/or received by a first node are duplicated and transmitted to a second node (e.g., for further processing). In some cases, a subset of the data traffic 106 can be mirrored in accordance with a filter that specifies one or more traffic mirroring rules. Any data packet among the data traffic 106 that complies with the one or more traffic mirroring rules may be mirrored, and any data packet among the data traffic 106 that does not comply with the one or more traffic mirroring rules may not be mirrored. The one or more traffic mirroring rules may specify, for instance, at least one of whether a data packet is associated with a particular interface (e.g., a port, a network interface, or the like), whether the data packet is associated with a particular Virtual Local Area Network (VLAN), whether the data packet is associated with a particular subnet, or the like. The term "port mirroring," for example, can refer to a process by which data packets transmitted and/or received by a port are duplicated and transmitted to another port (e.g., in a different node). As used herein, the term "port," and its equivalents, can refer to a component of a node configured to connect the rest of the node to an interface, such as a Network Interface Controller (NIC). A node may have a fixed set of ports that can be selectively connected to particular interfaces. Each port of a node may have a unique identity, which may be represented by a port number. As used herein, the terms "ingress port," "entry port," and their equivalents, can refer to a port at which a packet enters a node. As used herein, the terms "egress port," "exit port," and their equivalents, can refer to a port at which a packet exits a node.

In various examples, the user may initiate mirroring of the data traffic 106 by causing the computing device 108 to transmit, to the source 104, a request for traffic mirroring. The request can include one or more data packets transmitted over the source network 102. The request may, in some cases, specify at least one condition of a type of the data traffic 106 to be mirrored. Thus, in some examples, only a portion of the data traffic 106 may be mirrored. The source 104 can generate mirrored traffic 110 based on the data traffic 106. The mirrored traffic 110 may include one or more data packets copied from data packets in the data traffic 106.

According to various implementations, the user(s) associated with the source 104 may seek to have the mirrored traffic 110 analyzed in a destination 112 included in a destination network 114. The destination network 114 may be different than the source network 102. For example, the destination network 114 may be a cloud-based network that is outside of the source network 102. In some cases, the destination network 114 may be a first region in a cloud-based network, and the source network 102 may be a second region in the cloud-based network, wherein the first region is different than the second region.

The destination 112 may be a node in the destination network 114. In some cases, the destination network 114 is also a cloud-based network, and the destination 112 may be hosted by computing resources in the destination network 114. In some cases, the destination 112 can be a traffic analyzer. The user(s) may use the destination 112 to analyze the mirrored traffic 110 for any of a variety of reasons. For example, the destination 112 may be a native traffic analyzer associated with the destination network 114, and the user(s) may want to test the efficacy of the destination 112 as a traffic analyzer. For example, the traffic analyzer may perform application-specific processing (e.g., applying one or more security policies, analyzing content, such as video processing, or the like) on the mirrored traffic 110. In some cases, the source network 102 may have an associated traffic analyzer, but it may be inferior to the traffic analyzer embodied in the destination 112. In some cases, the traffic analyzer embodied in the destination 112 may be hosted in the destination network 114, rather than the source network 102, to conserve resources of the source network 102. In some cases, the destination 112 can be a load balancer. For example, the destination 112 may be configured to forward data traffic to one or more additional nodes in the destination network 114 according to a particular load balancing protocol.

However, in various implementations, the source 104 may be unable to directly forward the mirrored data traffic 110 to the destination 112. The source 104 may be unable to directly exchange data packets with nodes in the destination network 114 and/or the destination 112 may be unable to directly exchange data packets with nodes in the source network 102. For example, a service provider of the source network 102 and/or the destination network 114 may restrict and/or prevent cross-region traffic mirroring. For instance, IP addresses of nodes in the source network 102 may be abstracted from communications associated with the source network 102. In some cases, the source network 102 and the destination network 114 may each use different, proprietary communication protocols, such that data packets transmitted by nodes in the source network 102 cannot be understood by nodes in the destination network 114, and vice versa.

A controller 116 may be connected to the source network 102 and the destination network 114 and may enable communications between the source network 102 and the destination network 114. In various implementations, the controller 116 may be configured to control and/or manage a network fabric that includes at least one node in the source network 102 and at least one node in the destination network 114. For instance, the controller 116 may be a Service Defined Network (SDN) controller. In some cases, the controller 116 can be embodied in a physical device (e.g., a server) located on the same premises as the computing device 108 (e.g., in an on-premises data center). In some implementations, the controller 116 can be embodied in resources of the source network 102 or resources of the destination network 114. In various cases, the controller 116 may be connected to the computing device 108. The computing device 108 may transmit, to the controller 116 a forwarding request 118. The forwarding request 118 can include the request for mirroring of the data traffic 106 and/or a request to forward the mirrored traffic 110 to the destination 112. In various implementations, the forwarding request 118 can be, or include, a session configuration that identifies the requested forwarding session between the source 104 and the destination 112. The forwarding request 118 can include at least one data packet. In response to receiving the forwarding request 118, the controller 116 may direct the source 104 to forward the mirrored traffic 110 to a source forwarder 120 in the source network 102. As used herein, the term "forwarder," and its equivalents, can refer to a network node (e.g., at least one of a process, container, VM, a Virtual Private Cloud (VPC), a Virtual Private Network (VPN), or the like), in a network, that is configured to forward data traffic between another node in the network (e.g., a source node or a destination node) and an entity outside of the network (e.g., a controller). The controller 116 may be connected to the source forwarder 120 in the source network 102. For example, the controller 116 may be connected to the source forwarder 120 via a VPN. In various implementations, the source forwarder 120 is a node in the source network 102.

In various implementations, in response to receiving the forwarding request 118, the controller 116 may identify that the destination 112, which may be specified in the forwarding request 118, is located in a different network than the source 104. That is, the controller 116 may identify that the destination 112 is in the destination network 114, and the source 104 is in the source network 102. In response to identifying that the source 104 and the destination 112 are in different networks, the controller 116 may generate an entry in a session datastore 124 corresponding to a session requested by the forwarding request 118 and that includes the transfer of the mirrored traffic 110 from the source 104 to the destination 112. As used herein, the terms "session," "flow," "data flow," "traffic flow," "packet flow," and their equivalents, can refer to multiple packets transmitted from a source to a destination. In some examples, a session may include packets that share at least one of the same ingress interface (e.g., SNMP ifIndex), source (e.g., from the same IP address), destination (e.g., directed to the same IP address), protocol (e.g., IP protocol), source port (e.g., for UDP or TCP), destination port (e.g., for UDP, TCP, or ICMP), or type of service (e.g., IP Type of Service (ToS)). The session including the mirrored traffic 110 forwarded from the source 104 to the destination 112 may be referred to as "a mirrored traffic forwarding session." In particular implementations, the entry may include an identifier of the mirrored traffic forwarding session, which may be referred to as a "session identifier" or "session ID". In some cases, the entry may include at least one of an identifier (e.g., an IP address) of the source 104, an identifier (e.g., an IP address of the destination 112), an identifier (e.g., an IP address) of the source forwarder 120, an identifier (e.g., an IP address) of the destination forwarder 126, or a Quality of Service (QoS) of the mirrored traffic forwarding session. For instance, the QoS of the mirrored traffic forwarding session may be a low precedence QoS. The entry can be stored in a hash table in the session datastore 124, in some cases. In various implementations in which multiple entries are stored in the session datastore 124, the entries can be indexed according to session identifier.

In various implementations, the controller 116 may transmit, to the source forwarder 120, an indication of the mirrored traffic forwarding session, such as at least a portion of the data in the entry of the session datastore 124. For example, the controller 116 may transmit the session identifier to the source forwarder 120 and/or an indication that the data packets in the mirrored traffic forwarding session should be transmitted by the source forwarder 120 to the controller 116. The source forwarder 120 may store the indication of the mirrored traffic forwarding session in a datastore (e.g., in a routing table). Further, the controller 116 may transmit, to the destination forwarder 126, an indication of the mirrored traffic forwarding session, such as at least a portion of the data in the entry of the session datastore 124. For instance, the controller 116 may transmit the session identifier to the destination forwarder 126 and/or an indication that the data packets in the mirrored traffic forwarding session should be transmitted by the destination forwarder to the destination 112. The destination forwarder may store the indication of the mirrored traffic forwarding session in a datastore (e.g., a routing table).

According to various implementations, the source 104 may forward the mirrored traffic 110 to the source forwarder 120. For example, the source forwarder 120 may be defined as a destination for the mirrored traffic 110 in a native traffic mirroring service associated with the source network 102. Upon receiving the mirrored traffic 110, the source forwarder 120 may identify the session identifier using the indication stored at the source forwarder 120 (e.g., in a routing table). Thus, the source forwarder 120 may determine to forward the mirrored traffic 110 to the controller 116. In various implementations, the source forwarder 120 may encapsulate the mirrored traffic 110 to generate encapsulated traffic 122. For example, the source forwarder 118 may encapsulate at least one data packet in the mirrored traffic 110 in accordance with a Generic Routing Encapsulation (GRE) protocol.

In various implementations, the source forwarder 120 may translate at least one data packet in the mirrored traffic 110 into a standardized format prior to encapsulation. In some cases, the mirrored traffic 110 may be in accordance with a networking protocol (e.g., a proprietary communication protocol) associated with the source network 102. According to various implementations, the source forwarder 120 may translate the mirrored traffic 110 into the standardized format using libraries such as Libpcap, Libnet, or IPtables. The source forwarder 120 may use Libpcap, for instance, to capture, filter, and manipulate the raw mirroring packets within the mirrored traffic. The source forwarder 120 may use Libnet, for instance, to perform packet construction and injection. In some cases, the source forwarder 120 may use IPtables to inspect and alter packets. Libpcap, Libnet, and IPtables are example utilities that can be used by the source forwarder 120, and in various implementations of the present disclosure, other utilities and/or techniques can be utilized by the source forwarder 120 to translate the mirrored traffic 110. In some instances, the standardized format includes an Encapsulated Remote Switched Port Analyzer (ERSPAN) format. In some cases, source forwarder 120 may add the session identifier to an ERSPAN header of the encapsulated traffic 122.

The ERSPAN packet format is associated with a specific header format that includes various elements. For example, an ERSPAN header may include an Ethernet frame with one or more type-length-value (TLV) variables to convey information about the forwarding session, such as at least one of: a type of the data packet (e.g., a request or reply); a system time stamp; a frame sequence number; source ERSPAN session information (e.g., session number, description, and configuration); source device information (e.g., device name, device location, and operating system version); source and destination device addresses (e.g., IP addresses); platform-specific TLVs; crypto checksum TLVs (e.g., a password-based Secure Hash Algorithm (SHA)-1 or SHA-256 checksum), or the like. In various examples the session number specified in the ERSPAN header may be utilized as the session identifier. Further, the span session between the source 104 and the destination 112 (or between the source forwarder 120 and the destination forwarder 126) may be further defined according to one or more of the TLV variables in the ERSPAN header.

The source forwarder 120 may transmit the encapsulated traffic 122 outside of the source network 102 and to the controller 116. The controller 116, in various implementations, may identify that the encapsulated traffic 122 should be forwarded to the destination network 114 and/or the destination 112. For example, the controller 116 may extract the session identifier from the encapsulated traffic 122 and use the session identifier to identify the entry corresponding to the mirrored traffic forwarding session in the session datastore 124. For example, the controller 116 may identify the session identifier in the encapsulated traffic 122, identify an entry in a session data store corresponding to the session identifier, and may identify that the encapsulated traffic 122 should be forwarded to a destination forwarder 126 in the destination network 114, based on the entry. For example, the controller 116 may identify that the encapsulated traffic 122 is to be sent to the destination 112 and may forward the encapsulated traffic 122 to the destination 112. Accordingly, the controller 116 may transmit the encapsulated traffic 122 to the destination forwarder 126.

In various implementations, the destination forwarder 126 can be a node in the destination network 114. Upon receiving the encapsulated traffic 122 from the controller 116, the destination forwarder 126 may identify that the encapsulated traffic 122 is part of the mirrored traffic forwarding session that should be forwarded to the destination 112. For example, the destination forwarder 126 may identify the session identifier in the encapsulated traffic 122 and may use the session identifier to identify an entry in a routing table corresponding to the mirrored traffic forwarding session, wherein the entry may identify that the data packets in the session should be forwarded to the destination 112. Accordingly, the destination forwarder 126 may forward the mirrored traffic 110 to the destination 112 based on the encapsulated traffic 122. For example, the destination forwarder 126 may decapsulate the encapsulated traffic 122 and/or convert the mirrored traffic 110 into a communication format associated the destination 112 and/or the destination network 114. For example, the destination forwarder 126 may use at least one of Libpcap, Libnet, or IPtables to translate the encapsulated traffic 122 into the mirrored traffic 110, wherein the mirrored traffic 110 may have a format that is acceptable to the destination 112. Accordingly, the destination 112 may be configured to process the mirrored traffic 110 even if the mirrored traffic 110 generated by the source 104 was originally in an unacceptable format to the destination 112.

Upon receiving the mirrored traffic 110, the destination 112 may perform various operations based on the mirrored traffic 110. For example, the destination 112 may analyze the mirrored traffic 110 and/or generate one or more analysis reports that can be transmitted to and/or displayed on the computing device 108. In some examples, the destination 112 may include a load balancer that may forward the mirrored traffic 110 to one or more other nodes in the destination network 114.

In various implementations, the mirrored traffic 110 can be forwarded along a path that traverses the different networks (the source network 102 and the destination network 114), regardless of whether the different networks utilize different networking protocols within their respective communication networks. As used herein, the terms "path," "network path," and their equivalents, can refer to a specific sequence of nodes and/or interfaces over which a packet can traverse. A path may be defined between two nodes. In some cases, a path of a packet transmitted from a first node to a second node may be defined according to an identity of the first node, an identity of the second node, as well as any sequence of intermediary nodes and/or interfaces over which the packet travels from the first node to the second node. The mirrored traffic 110 may be forwarded between the source network 102 and the destination network 114 by the controller 116.

An illustrative example will now be described with respect to the example environment 100 of FIG. 1. In the example, an organization may be using various resources in the source network 102 and destination network 114 to host a video gaming service. However, the organization may be suspicious that a latency associated with the video gaming service is becoming problematic. For example, the organization may have received a complaint from a user indicating that the user noticed a delay between the user directing a video game character to move in the video gaming service and the video game character moving in a display of a device associated with the user. Accordingly, the organization may seek to determine whether abnormal traffic at the video gaming service is due to abnormal data traffic at the video gaming service. The organization may be associated with a dedicated analyzer service that can analyze the data traffic. However, the analyzer service may be located in a different network than the video gaming service. With reference to FIG. 1, the video game service may be the source 104 and the analyzer service may be the destination 112.

In order to enable the analyzer service to analyze the data traffic at the video game service, an individual in the organization may direct the controller 116 to establish a traffic mirroring forwarding session from the source 104 to the destination 112. For instance, the individual may use the computing device 108 to transmit the forwarding request 118 to the controller 116, which may in turn establish an entry in the session datastore 124 corresponding to the traffic mirroring forwarding session. The controller 116 may also direct the source forwarder 120 and the destination forwarder 126 to transmit packets in the session from the source 104 to the destination 112. The controller 116 may also instruct the video game service at the source 104 to generate the mirrored traffic 110. The mirrored traffic 110 may include copies of one or more data packets transmitted and/or received by the video game service.

In accordance with various implementations described herein, the mirrored data traffic 110, including the mirrored data packets form the video game service, can be transmitted to the analyzer service at the destination 112. Upon receiving the mirrored data traffic 110, the analyzer engine may analyze the mirrored data traffic 110. For example, the analyzer engine may identify that an abnormal number amount of data traffic is being received by the source 104 from a suspicious IP address. The analyzer engine may indicate the suspicious IP address to the organization (e.g., in a report displayed at the computing device 108). Accordingly, an individual (e.g., an administrator) in the organization may update a firewall policy for the source 102 that blocks traffic from the suspicious IP address. These and other advantages can be achieved even when the source 102 and the destination 112 are located in different networks associated with different communication protocols.

Figure 2:
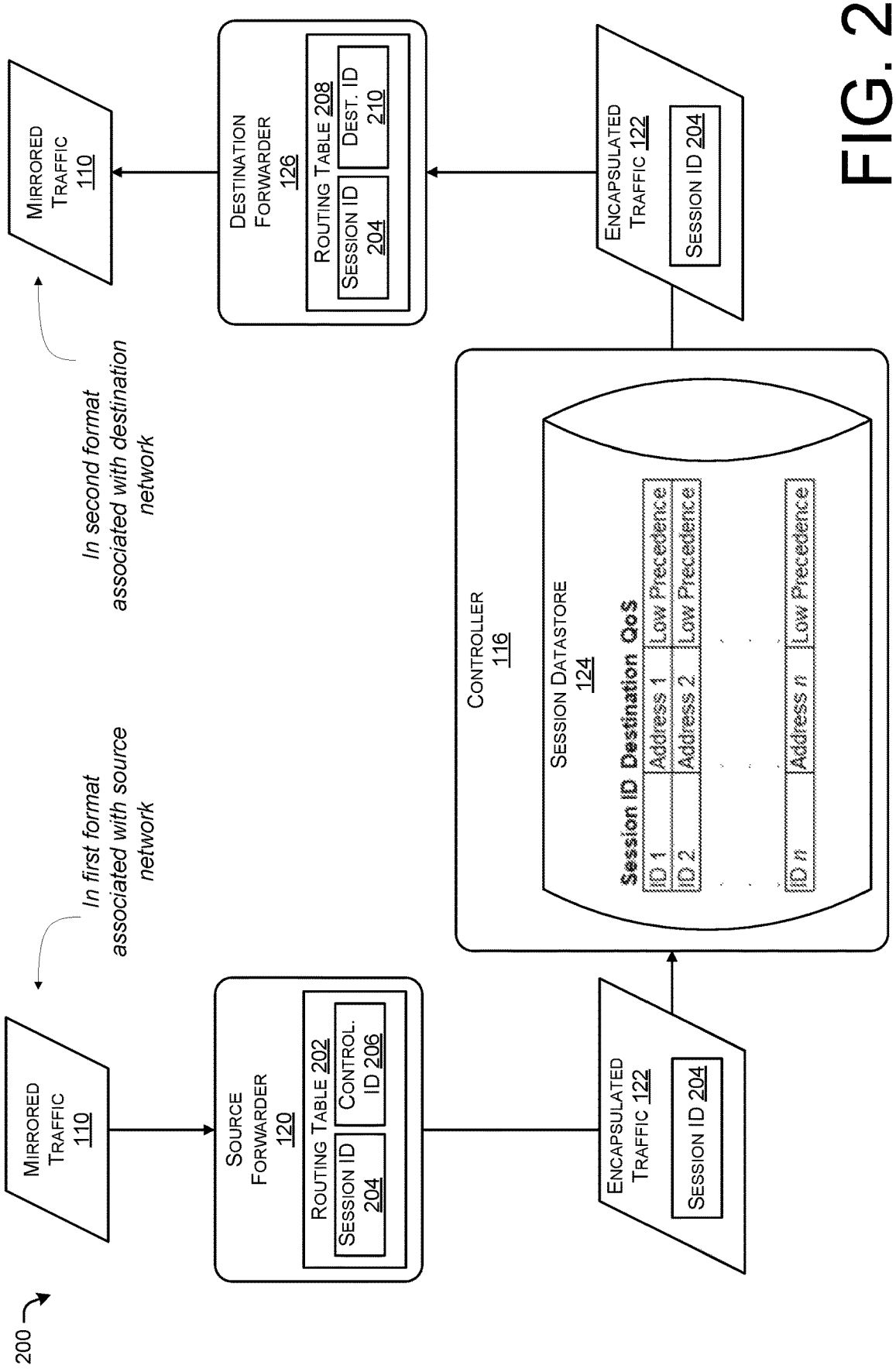
FIG. 2 illustrates an example environment for transmitting data packets in a mirrored traffic forwarding session.

FIG. 2 illustrates an example environment 200 for transmitting data packets in a mirrored traffic forwarding session. The environment 200 includes the mirrored traffic 110, the controller 116, the source forwarder 120, the encapsulated traffic 122, the session datastore 124, and the destination forwarder 126 described above with reference to FIG. 1.

As illustrated, the mirrored traffic 110 is received by the source forwarder 120. The source forwarder 120 may identify that the mirrored traffic 110 is part of a particular mirrored traffic forwarding session. For example, the source forwarder 120 may reference a routing table 202 that includes a session identifier 204 of the mirrored traffic forwarding session. In some cases, the routing table 202 further identifies that the mirrored traffic 110 should be forwarded to the controller 116. For instance, the routing table 202 may include a controller identifier 206, which may identify the controller 116. In some cases, the controller identifier 206 includes an IP address of the controller 116.

The source forwarder 120 may translate encapsulate the mirrored traffic 110 from a first format (e.g., a first communication protocol) into a standardized format. In various implementations, the source forwarder 120 may encapsulate the mirrored traffic 110 to generate the encapsulated traffic 122. According to various examples, the source forwarder 120 may generate the encapsulated traffic 122 to include the session identifier 204. The source forwarder 120 may transmit the encapsulated traffic 122 to the node specified by the controller identifier 206, i.e., the controller 116.

In various cases, the controller 116 may be responsible for managing multiple mirrored traffic forwarding sessions, which may be specified in various entries of the session datastore 124. Each entry may specify a session identifier of the session, a destination of the session, and/or a Quality of Service (QoS) of the session. For example, as illustrated in FIG. 2, the session datastore 124 may include n entries corresponding to n mirrored traffic forwarding sessions. The n entries include session identifiers 1 to n, destination addresses 1 to n, and QoS indications as "low precedence." Due to the QoS associated with the different mirrored traffic forwarding sessions, the controller 116 may deprioritize the data packets in the mirrored traffic forwarding sessions under other types of data packets (e.g., other types of control and/or data plane data packets) transferred through the controller 116.

Upon receiving the encapsulated traffic 122, the controller 116 may identify the entry in the session datastore 124 corresponding to the encapsulated traffic 122 using the session identifier 204 in the encapsulated traffic 122. The controller 116 can therefore identify the destination for the encapsulated traffic 122 using the entry. In some cases, the entry may specify an address (e.g., an IP address) of the final destination (e.g., the destination 112) of the data packets in the session and/or an address (e.g., an IP address) of the destination forwarder 126. Accordingly, the controller 116 may identify the destination forwarder 126 based on the session datastore 124.

Although not illustrated, the controller 116 may identify the destination forwarder 126 among multiple destination forwarders (associated with one or more other networks) using the session datastore 124. For example, the session ID 204 in the encapsulated traffic 122 may be "ID 1," and an address of the destination forwarder 126 may be "Address 1," as indicated in the session datastore 124. However, a session ID associated with a different mirrored traffic forwarding session may be "ID 2" and may include a different destination forwarder (not illustrated) associated with "Address 2." Accordingly, even though the controller 116 may be connected to other destination forwarders, the controller may refrain from forwarding the encapsulated traffic 122 to any destination forwarder but the destination forwarder 126 associated with the particular mirrored traffic forwarding session including the encapsulated traffic 122.

The controller 116 can transmit the encapsulated traffic 122 to the destination forwarder 126. The destination forwarder 126 may identify the mirrored traffic forwarding session based on the session identifier 204 in the encapsulated traffic 122. In various implementations, the destination forwarder 126 may store the session identifier 204 with a destination identifier 210, which may identify the destination (e.g., the destination 112) for the data packets in the mirrored traffic forwarding session. The destination forwarder 126 may decapsulate the encapsulated traffic 122 to recover the mirrored traffic 110. In some implementations, the destination forwarder 126 may translate the mirrored traffic 110 from the standardized format into a second format that is suitable for the destination and/or the destination network. Accordingly, the destination forwarder 126 may transmit the mirrored traffic 110 to the destination in a format that is suitable for the destination.

Figure 3:
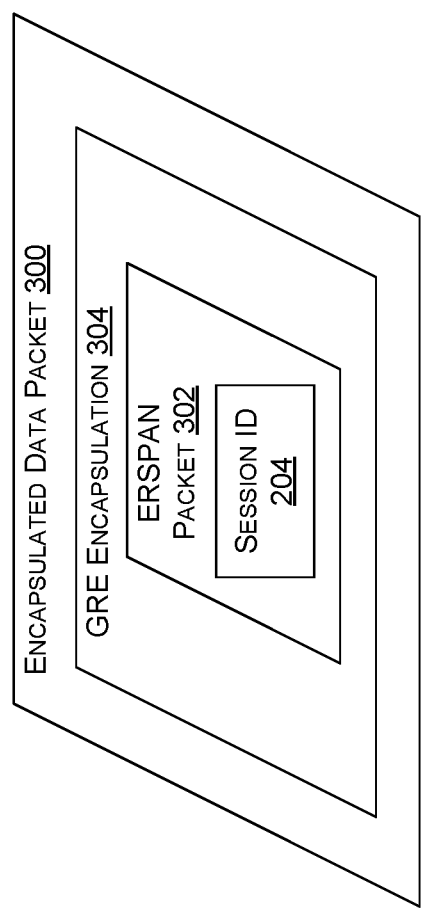
FIG. 3 illustrates an example of an encapsulated mirrored data packet.

FIG. 3 illustrates an example of an encapsulated mirrored data packet 300. In various implementations, the encapsulated packet can be included in encapsulated traffic, such as the encapsulated traffic 122 described above with reference to FIGS. 1 and 2. As illustrated, the encapsulated packet 300 may include an ERSPAN packet 302. The ERSPAN packet 302 may include the session identifier 204. In various implementations, the ERSPAN packet 302 may include data from one or more mirrored data packets. The encapsulated packet 300 may also include a GRE encapsulation 304 around the ERSPAN packet 302. Accordingly, the encapsulated packet 300 may be in a standardized format that can be analyzed by forwarders (e.g., the source forwarder 120 and/or the destination forwarder 126 described above with reference to FIGS. 1 and 2) and controllers (e.g., the controller 116 described above with reference to FIGS. 1 and 2).

Figure 4:
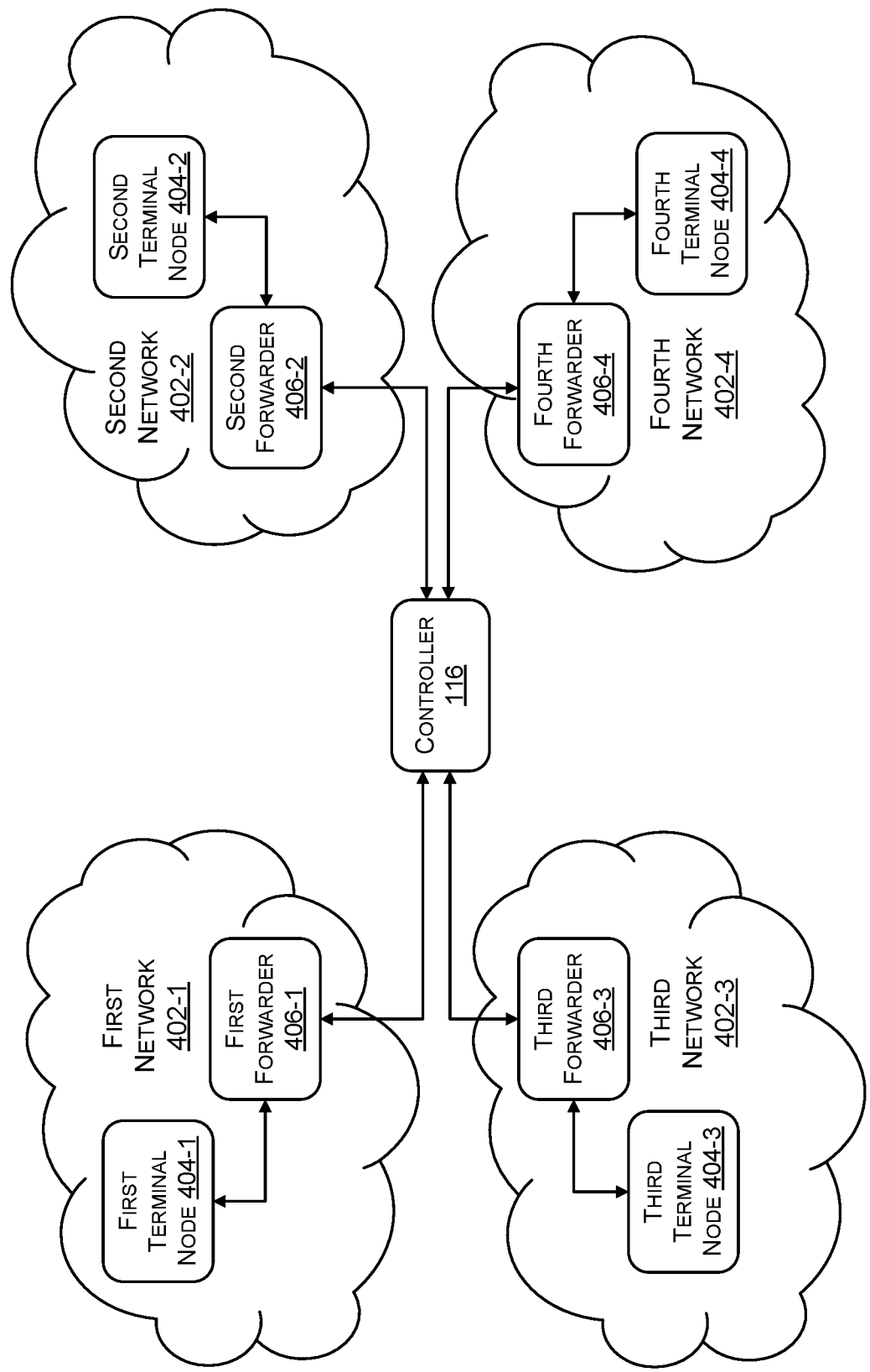
FIG. 4 illustrates an interconnected hybrid network environment.

FIG. 4 illustrates an interconnected hybrid network environment 400. As illustrated, the environment 400 includes the controller 116 described above with reference to FIGS. 1 and 2. The controller 116 may be connected to multiple networks including a first network 402-1, a second network 402-2, a third network 402-3, and a fourth network 402-4. Each one of the networks 402-1 to 402-4 may be a cloud-based network or a distinct region within a cloud-based network. A region can be defined as one or more data centers arranged in a distinct geographical area, which may include multiple availability zones. For instance, each network among the networks 402-1 to 402-4 may include a distinct internal communication network that is securely isolated from other networks among the networks 402-1 to 402-4. In some cases, one network among the networks 402-1 to 402-4 may be a source network (e.g., the source network 102 described above with reference to FIG. 1) and/or another network among the networks 402-1 to 402-4 may be a destination network (e.g., the destination network 114 described above with reference to FIG. 1).

In various implementations, the controller 116 may be configured to control and/or manage a network fabric that includes nodes in the networks 402-1 to 402-4. The controller 116 may be securely connected to the networks 402-1 to 402-4. For example, communications between the controller 116 and any one of the networks 402-1 to 402-4 may be transmitted over a respective VPN. Accordingly, even though the controller 116 may be outside of some or all of the networks 402-1 to 402-4, the networks 402-1 to 402-4 may remain secured from malicious data traffic.

The networks 402-1 to 402-4 may include respective terminal nodes 404-1 to 404-4. The terminal nodes 404-1 to 404-4 may include sources and/or terminals of various mirrored traffic forwarding sessions. For example, one of the terminal nodes 404-1 to 404-4 can be the source 104 described above with reference to FIG. 1, and another one of the terminal nodes 404-1 to 404-4 can be the destination 112 described above with reference to FIG. 1. In various cases, the terminal nodes 404-1 to 404-4 can generate mirrored data traffic and/or receive mirrored data traffic from other terminal nodes 404-1 to 404-4, such as terminal nodes in other networks.

The networks 402-1 to 402-4 may additionally include respective forwarders 406-1 to 406-4. The forwarders 406-1 to 406-4 may be configured to relay mirrored data traffic between the networks 402-1 to 402-4 and the controller 116. For example, one of the forwarders 406-1 to 406-4 can be the source forwarder 120 described above with reference to FIGS. 1 and 2, and another one of the forwarders 406-1 to 406-4 may be the destination forwarder described above with reference to FIGS. 1 and 2. In various implementations, any one of the forwarders 406-1 to 406-4 may be configured to receive mirrored data traffic, translate the mirrored data traffic into a standardized format, encapsulate the mirrored data traffic, and forward the mirrored data traffic to the controller 116. In some implementations, any one of the forwarders 406-1 to 406-4 may be configured to receive mirrored data traffic, translate the mirrored data traffic into a suitable format for its respective network 402-1 to 402-4, decapsulate the mirrored data traffic, and forwarder the mirrored data traffic to a respective one of the terminal nodes 404-1 to 404-4.

In various implementations described herein, the controller 116 and/or the forwarders 406-1 to 406-4 may enable mirrored data traffic to be forwarded to various networks 402-1 to 402-4 in the hybrid network environment 400. For example, the controller 116 may establish a session identifier associated with a mirrored traffic forwarding session between the first terminal node 404-1 in the first network 402-1 and the second terminal node 404-2 in the second network 402-2. The controller 116 may store the session identifier in an entry of a session datastore (e.g., the session datastore 124 described above with reference to FIGS. 1 and 2), along with an indication that the data packets in the session are to be forwarded from the first forwarder 406-1 to the second forwarder 406-2. In addition, the controller 116 may instruct the first forwarder 406-1 to forward data packets in the session from the first terminal node 404-1 to the controller 116 and/or may instruct the second forwarder 406-2 to forward data packets in the session from the controller 116 to the second terminal node 404-2. The first forwarder 406-1 may forward the data packets in the session to the controller 116 with the designated session identifier. Accordingly, the controller 116 may identify the packets as being in the session from the first terminal node 404-1 to the second terminal node 404-2 based on the session identifier in the data packets. The controller 116 may therefore forward the data packets to the second forwarder 406-2, rather than to other forwarders in the environment 400, such as the third forwarder 406-3 or the fourth forwarder 406-4.

In some cases, the controller 116 may accommodate multiple mirrored traffic forwarding sessions in the environment 400, which may be between any pair of terminals among the terminals 404-1 to 404-4. Each one of the multiple sessions may be associated with an individual session identifier, which may be tracked in the datastore of the controller 116. Accordingly, the controller 116 may appropriately forward the data packets in the multiple sessions using the individual session identifiers. Further, the forwarders 406-1 to 406-4 may appropriately forward the data packets in the multiple sessions using the individual session identifiers.

Figure 5:
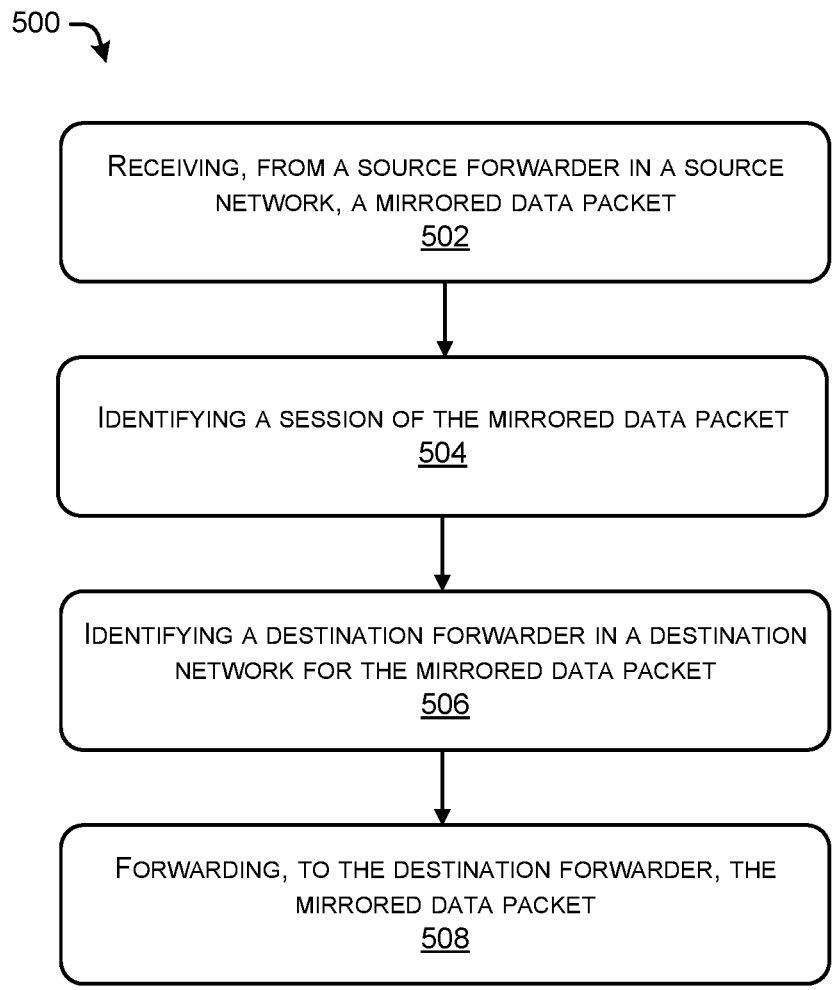
FIG. 5 illustrates an example process for forwarding mirrored data traffic in a hybrid network environment.

FIG. 5 illustrates an example process 500 for forwarding mirrored data traffic in a hybrid network environment. In various implementations, process 500 can be performed by an entity that includes a controller, such as the controller 116 described above with reference to FIGS. 1, 2, and 4.

At 502, the entity may receive a mirrored data packet from a source forwarder in a source network. In various implementations, the mirrored data packet may be copied from a data packet that is transmitted or received by a source node within the source network. The data packet may be transmitted or received over at least one interface connected to the source node within the source network. In some cases, the source node may generate the mirrored data packet in accordance with a native data traffic mirroring protocol associated with the source network. The source node may forward the mirrored data packet to the source forwarder in accordance with the data traffic mirroring protocol. In some cases, the source node and/or the source forwarder may include at least one Virtual Machine (VM) occupying at least one computing resource of the source network. The source network may be, for example, a cloud-based network.

In various instances, the source forwarder may modify the mirrored data packet before forwarding the mirrored data packet to the entity. For example, the source forwarder may translate the mirrored data packet from a first format (e.g., a format proprietary to the source network) to a second format. In some cases, the source forwarder may encapsulate the mirrored data packet according to an encapsulation protocol. According to some examples, the source forwarder may convert the mirrored data packet into an Encapsulated Remote Switch Port Analyzer (ERSPAN) data packet encapsulated in a Generic Routing Encapsulation (GRE).

At 504, the entity may identify a session of the mirrored data packet. The session may be a mirrored data traffic forwarding session, in various examples. According to some examples, the entity may identify the session by extracting a session identifier from the mirrored data packet. In various cases, the session identifier may be within an ERSPAN header of the mirrored data packet.

At 506, the entity may identify a destination forwarder in a destination network for the mirrored data packet. In various cases, the entity may access a datastore that stores entries associated with various mirrored traffic forwarding sessions managed by the entity. The entries may be indexed by session identifier. Accordingly, the entity may extract the entry associated with the mirrored data packet using the session identifier of the mirrored data packet. The entry may further indicate the destination forwarder. For example, the entry may indicate an address (e.g., an IP address) of the destination forwarder.

At 508, the entity may forward the mirrored data packet to the destination forwarder. The destination forwarder may be part of a destination network. In some cases, the destination forwarder may decapsulate the mirrored data packet. According to some examples, the destination forwarder may translate the mirrored data packet from the second format to a third format (e.g., a format proprietary to the destination network). The destination forwarder may forward the mirrored data packet to a destination node within the destination network. In some cases, the destination node may be a traffic analyzer configured to analyze the mirrored data packet using one or more rules. In some cases, the destination node may be a load balancer configured to forward the mirrored data packet to another node within the destination network in accordance with a load balancing protocol. In some cases, the destination node and/or the destination forwarder may include at least one VM occupying at least one computing resource of the destination network. The destination network may be, for example, a cloud-based network.

In various examples, the source network may be different than the destination network. For example, the source network can be a first region in a cloud-based network and the destination network can be a second region in the cloud-based network. In some cases, the source network can be a first cloud-based network and the destination network can be a second cloud-based network. Accordingly, the process 500 can enable traffic mirroring in a hybrid network environment.

Figure 6:
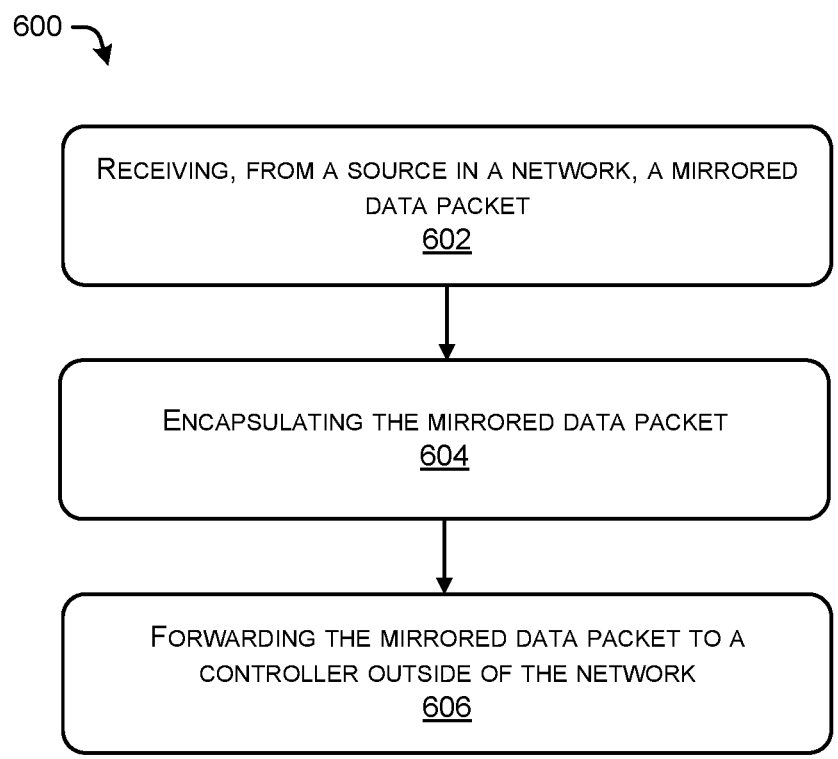
FIG. 6 illustrates an example process for forwarding mirrored data traffic out of a network.

FIG. 6 illustrates an example process 600 for forwarding mirrored data traffic out of a network. In various implementations, process 600 can be performed by an entity including a forwarder, such as the source forwarder 120 described above with reference to FIG. 1 and/or any of the forwarders 406-1 to 406-4 described above with reference to FIG. 4.

At 602, the entity may receive a mirrored data packet from a source node in a cloud-based network. In various implementations, the entity and the source node may be nodes within the network. In some cases, the mirrored data packet may be in a first format that is proprietary to the network. In various implementations, the mirrored data packet may be copied from a data packet that is transmitted or received by the source node. The data packet may be transmitted or received over at least one interface connected to the source node. In some cases, the source node may generate the mirrored data packet in accordance with a native data traffic mirroring protocol associated with the network. The source node may forward the mirrored data packet to the source forwarder in accordance with the data traffic mirroring protocol. In some cases, the source node and/or the source forwarder may include at least one Virtual Machine (VM) occupying at least one computing resource of the network. The network may be, for example, a cloud-based network.

According to various implementations, the mirrored data packet may include a cloud-native mirroring packet header. The entity performing the process 600 may identify that the mirrored data packet is to be forwarded to the controller by identifying (e.g., recognizing) the packet header of the mirrored data packet. In some cases, the controller may instruct the entity about the forwarding session associated with the mirrored data packet before the process 600 begins. For example, the controller may transmit, to the entity, an instruction to perform mirroring that indicates the packet header of the mirrored data packet. Accordingly, when the entity receives the mirrored data packet, the entity may recognize the forwarding session that the mirrored data packet is to be a part of, and may determine to forward the mirrored data packet outside of the cloud-based network of the source node. In some cases, the entity may handle (e.g., receive and/or forward) traffic from multiple mirroring sessions associated with the cloud-based network.

At 604, the entity may encapsulate the mirrored data packet. In some cases, the entity may translate the mirrored data packet from the first format to a second format. For example, the entity may convert the mirrored data packet into an Encapsulated Remote Switch Port Analyzer (ER-SPAN) data packet encapsulated in a Generic Routing Encapsulation (GRE).

In some cases, the entity may further identify a particular mirrored traffic forwarding session that includes the mirrored data packet. In some cases, the entity may add a session identifier associated with the particular session to the mirrored data packet. For instance, the session identifier may be added to an ERSPAN header of the mirrored data packet.

At 606, the entity may forward the mirrored data packet to a controller outside of the network. In various examples, the controller may be a Service Defined Networking (SDN) controller connected to multiple networks in a hybrid network environment. The controller may forward the mirrored data packet to another network for further processing.

Figure 7:
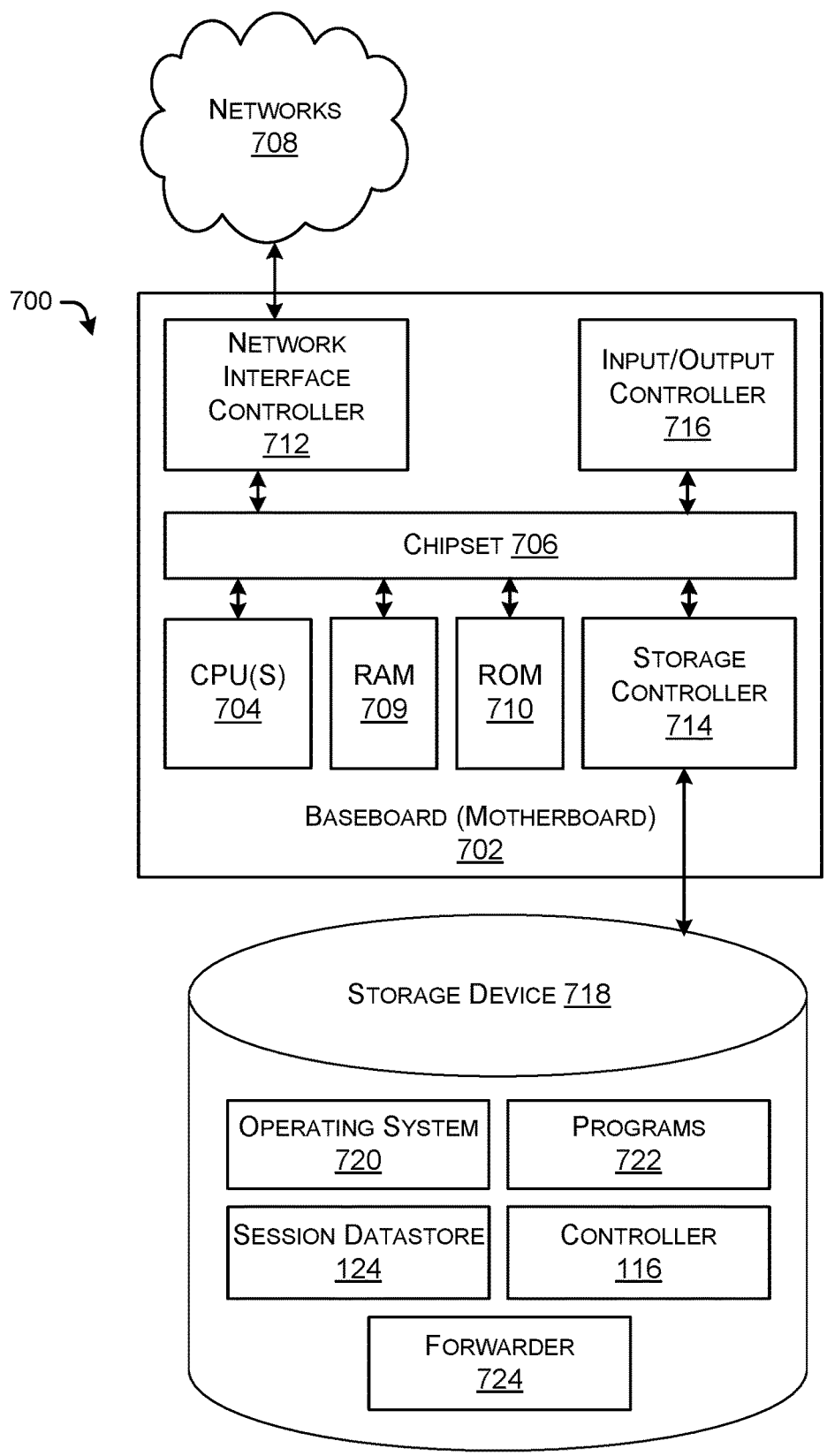
FIG. 7 shows an example computer architecture for a computer capable of executing program components for implementing the functionality described herein.

FIG. 7 shows an example computer architecture for a server computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 700 may, in some examples, correspond to a network node described herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 709, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a Network Interface Controller (NIC) 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems. In some instances, the NICs 712 may include at least on ingress port and/or at least one egress port.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by a network node (e.g., network node 404), source (e.g., 202), destination (e.g., 207), collector (e.g., 308), or central administrator (e.g., 312), may be supported by one or more devices similar to computer 700. Stated otherwise, some or all of the operations performed by a network node, collector, and/or central administrator, may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system includes the LINUX operating system. According to another embodiment, the operating system includes the WINDOWS® SERVER operating system from MICROSOFT Corporation of Redmond, Wash. According to further embodiments, the operating system can include the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

As illustrated in FIG. 7, the storage device 718 stores programs 722, as well as the controller 116, the session datastore 124, and/or a forwarder 724 (e.g., any of the forwarders 407-1 to 407-4 described above with reference to FIG. 4). In some implementations, at least one of the controller 116, the session datastore 124, or the forwarder 724 can be omitted from the storage device 718.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
   translating, by a source forwarder in a source cloud-based network, a mirrored data packet out of a first communication protocol and into an Encapsulated Remote Switch Port Analyzer (ERSPAN) format, the mirrored data packet comprising a copy of an original data packet that was transmitted or received by at least one node in the source cloud-based network, the original data packet complying with one or more traffic mirroring rules, the original data packet being in the first communication protocol;
   encapsulating, by the source forwarder, the mirrored data packet in a Generic Routing Encapsulation (GRE);
   transmitting, by the source forwarder, the mirrored data packet;
   receiving, by a controller and from the source forwarder, the mirrored data packet;
   identifying, by the controller, based on an ERSPAN header of the mirrored data packet, a session of the mirrored data packet, the session comprising transmission of multiple data packets between a source in the source cloud-based network and a destination in a destination cloud-based network, the multiple data packets comprising the mirrored data packet;
identifying, by the controller, based on the session, a destination forwarder in the destination cloud-based network, the destination cloud-based network being different than the source cloud-based network, the destination cloud-based network utilizing a second communication protocol that is different than the first communication protocol and is different than the ERSPAN format; and
forwarding, by the controller, the mirrored data packet to the destination forwarder.

2. The method of claim 1, wherein the source forwarder comprises a first virtual machine (VM), a first container, or a first program hosted in resources of the source cloud-based network, and
wherein the destination forwarder comprises a second VM, a second container, or a second program hosted in resources of the destination cloud-based network.

3. The method of claim 1, wherein the destination forwarder forwards the mirrored data packet to the destination, the destination comprising a traffic analyzer service in the destination cloud-based network.

4. The method of claim 1, wherein identifying the session comprises extracting, from the ERSPAN header of the mirrored data packet, a session identifier (ID).

5. A system, comprising:
at least one processor; and
memory storing instructions that, when executed by the at least one processor, cause the system to perform operations comprising:
translating, by a source forwarder in a source cloud-based network, a mirrored data packet out of a first communication protocol and into an Encapsulated Remote Switch Port Analyzer (ERSPAN) format, the first communication protocol being different than the ERSPAN format, the mirrored data packet comprising a copy of an original data packet that was transmitted or received by at least one node in the source cloud-based network, the original data packet complying with one or more traffic mirroring rules, the original data packet being in the first communication protocol;
encapsulating, by the source forwarder, the mirrored data packet in a Generic Routing Encapsulation (GRE);
identifying, by a controller, based on an ERSPAN header of the mirrored data packet, a session of the mirrored data packet;
identifying, by the controller, based on an entry of a datastore corresponding to the session, a destination forwarder in the destination cloud-based network, the destination cloud-based network being different than the source cloud-based network, the destination cloud-based network utilizing a second communication protocol that is different than the first communication protocol and is different than the ERSPAN format; and
forwarding, by the controller, the mirrored data packet to the destination forwarder.

6. The system of claim 5, wherein the source forwarder comprises a first virtual machine (VM) hosted in resources of the source cloud-based network, and
wherein the destination forwarder comprises a second VM hosted in resources of the destination cloud-based network.

7. The system of claim 5, wherein the destination forwarder forwards the mirrored data packet to a traffic analyzer service in the destination cloud-based network.

8. The system of claim 5, wherein identifying the session comprises extracting, from the ERSPAN header of the mirrored data packet, a session identifier (ID).

9. The system of claim 5, wherein the system is included in the source cloud-based network.

10. A system, comprising:
a forwarder in a first cloud-based network, the forwarder comprising:
at least one first processor; and
first memory storing first instructions that, when executed by the at least one first processor, cause forwarder to perform first operations comprising:
receiving, from a source in the first cloud-based network, a mirrored data packet in a first communication format, the mirrored data packet comprising a copy of an original data packet that was transmitted or received by at least one node in the first cloud-based network, the original data packet complying with one or more traffic mirroring rules, the original data packet being in the first communication format;
translating the mirrored data packet out of the first communication format and into an Encapsulated Remote Switch Port Analyzer (ERSPAN) format;
encapsulating the mirrored data packet in a Generic Routing Encapsulation (GRE); and
transmitting the mirrored data packet to a controller; and
the controller connected to the first cloud-based network, the controller comprising:
at least one second processor; and
second memory storing a table and second instructions that, when executed by the at least one second processor, cause the controller to perform second operations comprising:
receiving, from the source forwarder, the mirrored data packet;
identifying, based on a header of the mirrored data packet, a session of the mirrored data packet;
identifying, based on an entry of the table corresponding to the session, a destination forwarder in a second cloud-based network, the second cloud-based network being different than the first cloud-based network, the second cloud-based network utilizing a proprietary communication protocol comprising a second format that is different than the first format and different than the ERSPAN format, the second cloud-based network being operated by a different cloud provider than the first cloud-based network; and
forwarding the mirrored data packet to the destination forwarder.

11. The system of claim 10, further comprising:
the destination forwarder, comprising:
at least one third processor; and
third memory storing third instructions that, when executed by the at least one third processor, cause the destination forwarder to perform third operations comprising:
receiving, from the controller, the mirrored data packet;
decapsulating the mirrored data packet;
translating the mirrored data packet out of the ERSPAN format and into the second format; and
transmitting the mirrored data packet to a destination in the second cloud-based network.

12. The system of claim 11, wherein the first operations further comprise inserting a session identifier into the header of the mirrored data packet,
- wherein identifying the session of the mirrored data packet comprises identifying the session identifier in the header, and
- wherein the third operations further comprise identifying the destination based on the session identifier in the header.

13. The system of claim 10, wherein the controller is included in the source cloud-based network or the destination cloud-based network.

14. The system of claim 5, wherein the system comprises the controller executed by a server that is outside of the source cloud-based network and is outside of the destination cloud-based network.

15. The method of claim 1, further comprising:
- receiving a forwarding request indicating the session, the source, and the destination;
- identifying the destination cloud-based network based on the destination;
- identifying the source cloud-based network based on the source;
- determining that the destination cloud-based network is different than the source cloud-based network;
- in response to determining that the destination cloud-based network is different than the source cloud-based network, generating a session identifier corresponding to the session;
- transmitting, to the source forwarder, the session identifier and an identifier of the source; and
- storing, in an entry of a database, the session identifier and an identifier of the destination forwarder.

16. The method of claim 15, wherein identifying, based on the ERSPAN header of the mirrored data packet, the session of the mirrored data packet comprises extracting the session identifier from the ERSPAN header;
- wherein identifying, based on the session, the destination forwarder comprises identifying the entry of the database based on the session identifier.

17. The method of claim 15, the mirrored data packet being a first mirrored data packet, the method further comprising:
- receiving, by the source forwarder from the source, a second mirrored data packet in the first communication protocol;
- generating, by the source forwarder, the first mirrored data packet by translating the second mirrored data packet out of the first communication protocol and into the ERSPAN format;
- adding, by the source forwarder, the session identifier to the ERSPAN header of the first mirrored data packet; and
- in response to adding the session identifier to the ERSPAN header of the first mirrored data packet in the ERSPAN format, transmitting, by the source forwarder, the first mirrored data packet to the controller outside of the first cloud-based network.

18. The method of claim 1, wherein the source cloud-based network is operated by a different cloud provider than the destination cloud-based network.

* * * * *